United States Patent
Sackett, Sr.

[11] 3,713,277
[45] Jan. 30, 1973

[54] FOG IMPINGEMENT SCRUBBING SYSTEM
[75] Inventor: Walter J. Sackett, Sr., Severna Park, Md.
[73] Assignee: The A. J. Sackett & Sons Company, Baltimore, Md.
[22] Filed: Jan. 15, 1971
[21] Appl. No.: 106,782

[52] U.S. Cl. ..................55/223, 55/250, 55/259, 261/17, 261/116, 261/118
[51] Int. Cl. ............................................B01d 47/06
[58] Field of Search..........................55/93–95, 223, 55/233, 239, 244, 250, 255, 256, 259, 260; 261/3, 22, 36, DIG. 9, 17, 116, 118

[56] References Cited

UNITED STATES PATENTS

| | | | |
|---|---|---|---|
| 957,685 | 5/1910 | Kale | 261/117 |
| 1,563,125 | 11/1925 | Ward | 261/DIG. 9 |
| 1,999,589 | 4/1935 | Frey | 261/DIG. 9 |
| 2,604,185 | 7/1952 | Johnstone et al. | 261/DIG. 9 |
| 2,792,905 | 5/1957 | Forrest | 55/227 |
| 3,121,127 | 2/1964 | Hedin | 261/22 |
| 3,388,897 | 6/1968 | Calaceto | 261/DIG. 9 |
| 3,456,928 | 7/1969 | Selway | 251/DIG. 9 |
| 3,618,299 | 11/1971 | Vincent | 55/257 |
| 3,626,672 | 12/1971 | Burbidge | 55/259 |

Primary Examiner—Bernard Nozick
Attorney—Walter G. Finch

[57] ABSTRACT

A fog impingement scrubber system is provided for removing from an air stream particulate matter, such as product dust and combustion dust products, as well as fumes, and water soluble or water reactant vapors generated during a manufacturing process. The polluted air stream from the manufacturing process is fed to a fog impingement scrubber system. The polluted air stream is first sprayed by a series of high pressure water sprays to create a fog or mist to dampen or wet particulate matter in the air stream, particularly any fine or microscopic sized particles. A second set of water nozzles or sprays is then utilized further downstream of the fogging area to moisten the larger particles of particulate matter in the air stream. The sprayed polluted air stream is then impinged upon a whirlpool provided in the scrubbing system, where the moistened particles are removed from the air stream, and where the water soluble or water reactant vapors are treated. Any moisture in the air is then removed by a demisting system, and the clean air then discharged back to the atmosphere.

4 Claims, 3 Drawing Figures

INVENTOR
WALTER J. SACKETT SR.

BY Walter J. Finch
ATTORNEY

FOG IMPINGEMENT SCRUBBING SYSTEM

This invention relates generally to apparatus for separation of substances from exhaust vapors, and more particularly it pertains to a fog impingement type scrubber system for use in a chemical processing plant having anti-pollution features. Although this invention is illustrated in connection with a fertilizer processing plant, it is not limited thereto as it can be readily adapted for use in other types of manufacturing plants and processes.

At the present time, there is great emphasis on lowering the pollution of the environment. Thus, it is no longer permissible to freely discharge polluted vapors and liquids to the atmosphere which result from certain chemical reactions and material treatments.

Normally there are three states of waste material present, particularly in case of an ammonium-phosphate-potassium fertilizer type plant which uses continuous processing, namely, solid, liquid, and gas. For example, an ammoniator-granulator provides a waste consisting of ammonia, water vapor, acid fumes and finally divided ammonium and potassium chloride, while a dryer and cooler used in the system would generate waste consisting of ammonia and combustion dust products, and ammonia and product dust, respectively.

A principal object of this invention, therefore, is to provide a fog impingement scrubbing system which can be utilized efficiently for removing particulate matter, such as product dust and combustion dust products as well as obnoxious gases and fumes from an air stream created during a manufacturing process.

Still another object of this invention is to provide a fog impingement scrubber system for the retrieval of otherwise process chemicals and to improve the efficiency of a processing manufacturing system.

And even a further object of this invention is to provide a treatment process for removing pollution elements from exhaust air and vapors.

Still even another object of this invention is to provide a fog impingement scrubber system which can be used as part of a discharge control system for a chemical fertilizer processing plant which eliminates polluted air discharged to the atmosphere.

Also, still even another object of this invention is to provide a fog impingement scrubber system for scrubbing a polluted air stream generated by a chemical processing plant.

An object of this invention is to provide a fog impingement scrubbing system for recovering contaminants, such as particulate matter, from process-evolved vapors from chemical fertilizers and allied plants.

Even another object of this invention is to provide a fog impingement scrubber system which is economical to install and operate, and one which is efficient and reliable in operational use, and is easy to maintain.

Other objects and attendant advantages of this invention will become more readily apparent and understood from the following detailed specification and accompanying drawings in which.

Figure 1:
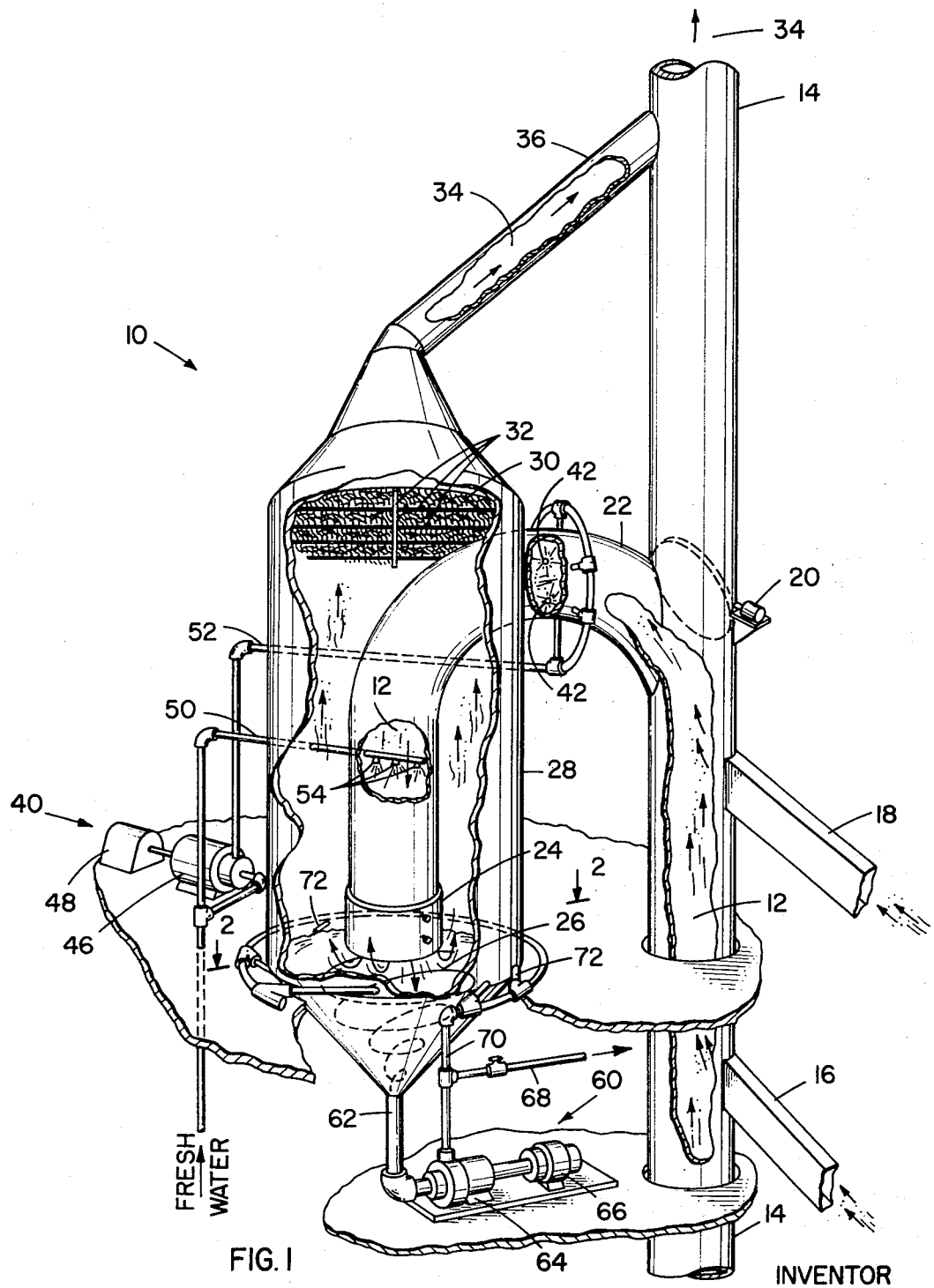
FIG. 1 is a perspective view of a fog impingement scrubbing system, with portions broken away for clarity, incorporating features of this invention.

Referring now to the drawings, particularly FIG. 1, there is shown a fog impingement scrubbing system 10 incorporating features of this invention. Such a fog impingement scrubbing system 10 can be used as part of a pollution control system as illustrated in my U.S. Pat. No. 3,499,731, issued Mar. 10, 1970, entitled "High Efficiency Control System for a Chemical Processing Plant," and in my U.S. Pat. No. 3,494,107, issued Feb. 10, 1970, entitled "Dust-Fume Control System."

Polluted air streams from such chemical, fertilizer, or allied processing plants, containing particulate matter of various sizes, products of combustion, fumes, and water soluble or water reactant vapors, are introduced by inlets or passageways 16 and 18 to an exhaust stack 14, as shown in FIG. 1.

The exhaust stack 14 is provided with a controlled rotatable gate 20. This gate 20 may be used either for directing the air stream 12 directly up the exhaust stack 14, or diverting the air stream 12 through a passageway or duct 22 connected to the exhaust stack 14 into a cylindrical tank 28 of the fog impingement scrubbing system 10 of this invention for treatment and removal of the pollutants therein before discharged to the atmosphere. The air stream 12 then passes through a first primary fogging area, generated by the spraying of high pressure water from a series of spray nozzels 42.

In this fogging area, a plurality of primary high pressure water spray nozzles 42, normally six spray nozzles arranged 60° apart, spray water to create a fine mist or fog to moisten the particulate matter and dust in the air stream, particularly the microscopic sized particles.

These spray nozzles 42 can preferably be arranged to direct the high pressure water sprays in the same direction as the flow of the air stream 12, or in a counter-direction thereto, or transversely thereto, as desired, to get the best effect of moistening of the particulate matter and dust particles, particularly the microscopic and sub-microscopic sized particles in the particulate matter and dust in order that all particles of various sizes can be subsequently removed from the air stream 12.

The nozzles 42 are connected by a high pressure line 52 to a high pressure pump 46 which is driven by a motor 48, with a fresh water line being connected to the pump 46. Pressures up to 500 pounds per square inch or higher if desired can be used in the spray nozzles 42.

The air stream 12 then continues through duct 22 to a secondary set of low pressure spray nozzles 54, which form a second spraying area for the larger particles of particulate matter in the air stream 12. These spray nozzles 54 are generally directing their low pressure water spray into the air stream 12 in the same direction as the flow of the air stream 12.

These spray nozzles 54 are connected by a water line 50 to a suitable source of low pressure fresh water. Spray nozzles 54 continue to moisten the particles of particulate matter in the air stream 12. If desired, the second set of nozzles 54 can be high pressure spray nozzles similar to nozzles 42. Normally, however, they spray low pressure water to moisten the larger particulate matter in the air stream 12. Also, they can be arranged to spray the water in a counter direction of the air stream 12 or transverse to the flow thereof, if desired for the best effect.

Figure 2:
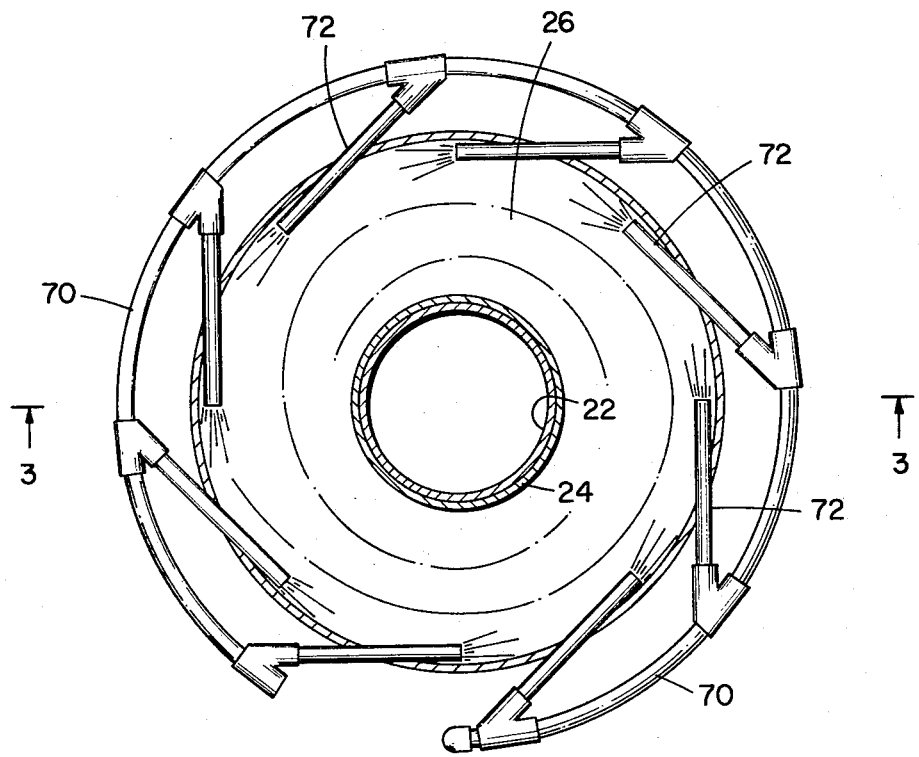
FIG. 2 is a section taken along lines 2—2 of FIG. 1, showing whirlpool effects of water jets.
Figure 3:
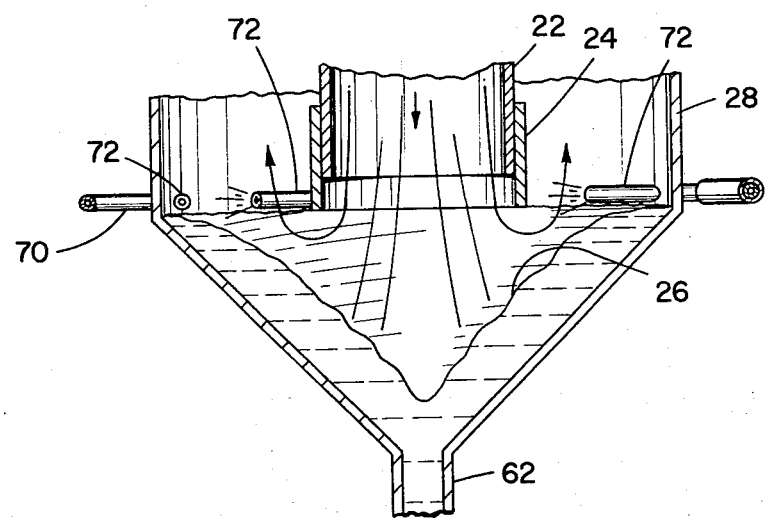
FIG. 3 is a section taken along line 3—3 of FIG. 2.

Subsequently, the air stream 12 emerges from the open end of duct 22 through an adjustable (up or down) sleeve 24 which is precisely located over a whirlpool 26, as shown in FIGS. 2 and 3. The air stream 12 impinges on the whirlpool 26.

This whirlpool 26 is formed by a pumping system 60 and the conical shaped bottom of the tank 28. This pumping system 60 consists of an outlet pipe 62 which is connected to the conical bottom of tank 28 and a recirculating pump 64, driven by a motor 66. The recirculating pump 64 is connected by a line 70 to a circular shaped water line positioned at the top of the conical shaped bottom of the tank 28. Water jets 72 are connected substantially tangentially to the circular shaped water line. The water line 70 feeds the plurality of spaced tangential water jets 72 which enter tank 28 at the bottom thereof to create the whirlpool 26. A branch line 68 connected to water line 70 carries the water, having all effluents or slurry deposited therein from the whirlpool 28, either continually or periodically back into the manufacturing process or for further disposal, as desired.

The sprayed particulate matter in the air stream 12 from the duct 22 is deposited in the whirlpool 26. Water soluble or water reactant vapors are eliminated by the scrubbing action of the whirlpool 28. The air which is not caught in the whirlpool 26, rises upwardly in the tank 28. The water mist in the air is collected on several layers of a fine mesh steel fabric 30 positioned near the top of the tank 12 by a framework 32. The clear and unpolluted air 34 now moves through the outlet 36 back into the exhaust stack 14 for discharge to atmosphere.

While this invention has been described in connection with a fertilizer processing plant other uses will suggest themselves wherever an air laden with a large volume of particulate matter, dust and water soluble or water reactant vapors is to be cleaned before release to the atmosphere and where it is important not to release an effluent to a stream or drain.

What is claimed is:

1. A fog impingement scrubbing system, comprising, structure defining a cylindrical shaped housing having a conical shaped bottom and a conical shaped top connected to an exhaust stack, a conduit connected to said exhaust stack for introducing into said housing an air stream from said exhaust stack to be treated for pollutants including particulate matter and water soluble and/or water reactant vapors contained therein, said conduit having a downstream end arranged concentrically of said housing and extending along the longitudinal axis of said housing, said conduit terminating above said conical shaped bottom, means for diverting said air stream from said exhaust stack to said conduit, means including a series of high pressure spray nozzles located upstream in said conduit and outside said housing for creating a fog area in said conduit through which said air stream passes for first water moistening of fine particulate matter contained therein; means including a series of low pressure nozzles positioned in said conduit downstream end downstream of said series of high pressure nozzles for water moistening of large particulate matter contained in said air stream, means including a series of spaced water jets tangentially arranged around the interior periphery of said conical shaped bottom of said housing for creating a whirlpool in said conical bottom of said housing for impingement of said air stream from said conduit thereon to remove the particulate matter from said air stream as well as treat any water soluble or water reactant vapors in said air stream from said conduit, adjustable extension conduit means positioned on the terminating end of said conduit for adjusting the distance from said whirlpool, means for removing said slurry generated in said whirlpool by the treatment of said air stream having said pollutants contained therein, and demisting means consisting of several parallel layers of fine mesh steel fabric positioned at the top of said housing for demisting the treated air stream from said conduit and said whirlpool.

2. A fog impingement scrubbing system as recited in claim 1, wherein the means including a series of high pressure spray nozzles consists of a high pressure pumping system.

3. A fog impingement scrubbing system as recited in claim 1, wherein said high pressure nozzles are positioned around the periphery of said conduit and are directed in the same direction as the flow of said air stream.

4. A fog impingement scrubbing system as recited in claim 1, wherein said low pressure spray nozzles are positioned in the same direction as the flow of said air stream.

* * * * *